(12) United States Patent
Shi et al.

(10) Patent No.: US 11,302,956 B2
(45) Date of Patent: Apr. 12, 2022

(54) NON-AQUEOUS ELECTROLYTE FOR LITHIUM ION BATTERY AND LITHIUM ION BATTERY

(71) Applicant: SHENZHEN CAPCHEM TECHNOLOGY CO., LTD., Guangdong (CN)

(72) Inventors: Qiao Shi, Guangdong (CN); Muchong Lin, Guangdong (CN); Shiguang Hu, Guangdong (CN); Jiaojiao Yun, Guangdong (CN)

(73) Assignee: SHENZHEN CAPCHEM TECHNOLOGY CO., LTD., Shenzhen (CN)

( * ) Notice: Subject to any disclaimer, the term of this patent is extended or adjusted under 35 U.S.C. 154(b) by 113 days.

(21) Appl. No.: 16/490,899

(22) PCT Filed: Jun. 23, 2017

(86) PCT No.: PCT/CN2017/089734
§ 371 (c)(1),
(2) Date: Sep. 4, 2019

(87) PCT Pub. No.: WO2018/196146
PCT Pub. Date: Nov. 1, 2018

(65) Prior Publication Data
US 2020/0020972 A1    Jan. 16, 2020

(30) Foreign Application Priority Data
Apr. 28, 2017   (CN) .......................... 201710297453.9

(51) Int. Cl.
H01M 10/0525    (2010.01)
H01M 10/0567    (2010.01)
H01M 10/0569    (2010.01)
H01M 4/131      (2010.01)
H01M 4/02       (2006.01)

(52) U.S. Cl.
CPC ....... *H01M 10/0525* (2013.01); *H01M 4/131* (2013.01); *H01M 10/0567* (2013.01); *H01M 10/0569* (2013.01); *H01M 2004/028* (2013.01); *H01M 2300/0025* (2013.01)

(58) Field of Classification Search
CPC ......... H01M 10/0525; H01M 10/0567; H01M 10/0569; H01M 4/131; H01M 2004/028; H01M 2300/0025; H01M 10/0568
See application file for complete search history.

(56) References Cited

U.S. PATENT DOCUMENTS 3,663,569 A    5/1972  Lew
6,174,629 B1   1/2001  Gan et al.
2013/0337341 A1*  12/2013  Tikhonov ......... H01M 10/0568
                                                      429/326

FOREIGN PATENT DOCUMENTS

| CN | 1310867 A   | 8/2001  |
| CN | 1495959 A   | 5/2004  |
| CN | 102195076 A | 9/2011  |
| CN | 103151559 A | 6/2013  |
| CN | 103354962 A | 10/2013 |
| CN | 103441304 A | 12/2013 |
| CN | 103460496 A | 12/2013 |
| CN | 103594729 A | 2/2014  |
| CN | 104300174 A | 1/2015  |
| CN | 105051965 A | 11/2015 |
| CN | 105161763 A | 12/2015 |
| CN | 105580189 A | 5/2016  |
| CN | 105633461 A | 6/2016  |
| CN | 105830270 A | 8/2016  |

(Continued)

OTHER PUBLICATIONS

International Search Report of PCT Patent Application No. PCT/CN2017/089734 dated Jan. 31, 2018.

(Continued)

*Primary Examiner* — Matthew W Van Oudenaren

(57) ABSTRACT

The application provides a non-aqueous electrolyte for lithium ion battery. The non-aqueous electrolyte for lithium ion battery comprises a compound A represented by formula I and a compound B represented by formula II,

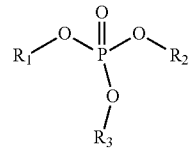
Formula I

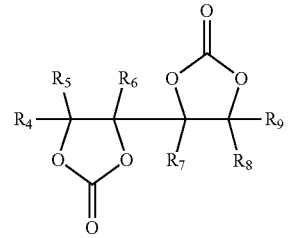
Formula II In formula I, $R_1$, $R_2$ and $R_3$ are independently selected from C1-C5 alkyl or haloalkyl, C2-C5 unsaturated hydrocarbon group or unsaturated halohydrocarbon group, and at least one of $R_1$, $R_2$ and $R_3$ is the unsaturated hydrocarbon group or unsaturated halohydrocarbon group; In formula II, $R_4$, $R_5$, $R_6$, $R_7$, $R_8$ and $R_9$ are each independently selected from one of hydrogen atom, fluorine atom and C1-C5 group. The non-aqueous electrolyte for lithium ion battery provided by the application enables the battery to have excellent cycle performance and high-temperature storage performance through the synergistic effect of the compound A and the compound B.

9 Claims, No Drawings

(56) References Cited

FOREIGN PATENT DOCUMENTS

| | | | |
|---|---|---|---|
| CN | 106058317 A | | 10/2016 |
| CN | 106252639 A | | 12/2016 |
| CN | 106328996 A | | 1/2017 |
| CN | 106410272 A | | 2/2017 |
| GB | 1147540 A | | 4/1969 |
| JP | 2000260467 A | | 9/2000 |
| JP | 2006219406 | * | 8/2006 |
| JP | 2006219406 A | | 8/2006 |
| JP | 2014182951 A | | 9/2014 |
| JP | 2014525667 A | | 9/2014 |
| JP | 2015092476 A | | 5/2015 |
| WO | 2016025589 A1 | | 2/2016 |
| WO | WO2016054843 | * | 4/2016 |
| WO | 2016151983 A1 | | 9/2016 |

OTHER PUBLICATIONS

Libo Hu et al., Fluorinated electrolytes for 5-V Li-ion chemistry: Dramatic enhancement of LiNi0.5Mn1.5O4/graphite cell performance by a lithium reservoir, Electrochemistry Communications, Apr. 2014, vol. 44, pp. 34-37.

* cited by examiner

NON-AQUEOUS ELECTROLYTE FOR LITHIUM ION BATTERY AND LITHIUM ION BATTERY

TECHNICAL FIELD

The invention relates to the field of lithium ion batteries, more particularly, to a non-aqueous electrolyte for lithium ion battery and lithium ion battery.

BACKGROUND

Consumer digital and electronic products require higher and higher energy density of batteries, which makes the current commercial lithium ion batteries difficult to meet the requirements. At present, the effective way to improve the battery energy density is to increase the working voltage of the lithium ion battery. The improvement of the working voltage of lithium ion battery can improve the battery energy density, however at the same time, the improvement of the working voltage can deteriorate the performance of battery. Because, on the one hand, the crystal structure of the positive electrode of battery is unstable under high voltage. In the process of charging and discharging, the crystal structure of the positive electrode of battery will collapse, resulting in deterioration of performance. On the other hand, under high voltage, the surface of the positive electrode is in a high oxidation state with high activity, which is easy to catalyze the oxidative decomposition of electrolyte, and the decomposition products of the electrolyte could easily deposit on the surface of the positive electrode, blocking the diffusion channel of lithium ions, thus deteriorating the performance of the battery.

In its Chinese patent application No. 00801010.2, Japan's Matsushita Electric Industrial Co., Ltd. has disclosed an electrolyte containing a compound of $(R_{1a})P=(O)(OR_{2a})(OR_{3a})$ (wherein $R_{1a}$, $R_{2a}$ and $R_{3a}$ each independently represent an aliphatic hydrocarbon group having 7 to 12 carbon atoms), which effectively controls the decrease in discharge capacity and the decrease in battery performances during high-temperature storage that occur as charging and discharging cycles proceed. However, a large number of studies have found that although unsaturated phosphate ester can improve the high-temperature storage and high-temperature cycle performances of batteries, the high-temperature storage and cycle performances still cannot meet the needs of the market.

SUMMARY

The invention aims to provide a non-aqueous electrolyte for lithium ion battery with better high-temperature cycle performance, and aims to solve the problem that the high-temperature storage and cycle performances of the existing non-aqueous electrolyte for lithium ion battery containing unsaturated phosphate ester cannot meet market demand.

The non-aqueous electrolyte for lithium ion battery provided by the present application, comprises a compound A represented by formula I and a compound B represented by formula II,

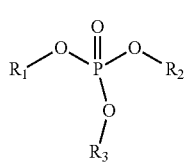

Formula I

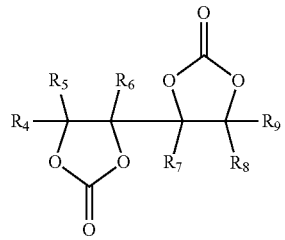

Formula II

In formula I, $R_1$, $R_2$ and $R_3$ are independently selected from C1-C5 alkyl or haloalkyl, C2-C5 unsaturated hydrocarbon group or unsaturated halohydrocarbon group, and at least one of $R_1$, $R_2$ and $R_3$ is the unsaturated hydrocarbon group or unsaturated halohydrocarbon group;

In formula II, $R_4$, $R_5$, $R_6$, $R_7$, $R_8$ and $R_9$ are each independently selected from one of hydrogen atom, halogen atom and C1-C5 group.

Preferably, the C1-C5 group is selected from a hydrocarbon group, halogenated hydrocarbon group, oxygen-containing hydrocarbon group, silicon-containing hydrocarbon group, and cyano-substituted hydrocarbon group.

Preferably, $R_4$, $R_5$, $R_6$, $R_7$, $R_8$ and $R_9$ are each independently selected from a hydrogen atom, fluorine atom, methyl group, ethyl group, methoxyl group, ethyoxyl group, triethylsiloxy group, cyano group or trifluoromethyl group.

Preferably, the compound B comprises one or more of compounds 1-9 represented by the following structural formulae,

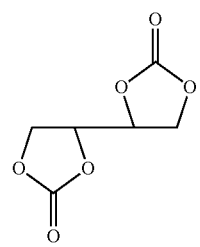

Compound 1

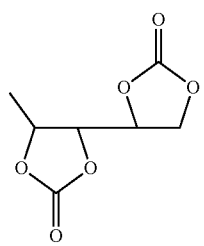

Compound 2

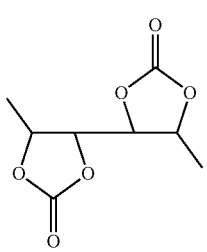

Compound 3

Compound 4
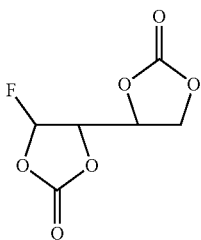

Compound 5
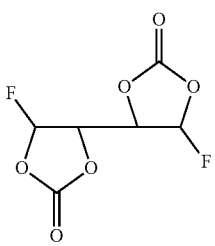

Compound 6
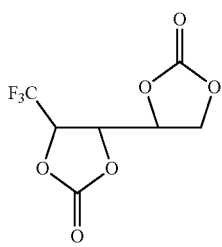

Compound 7
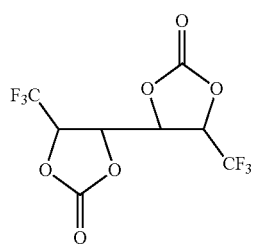

Compound 8
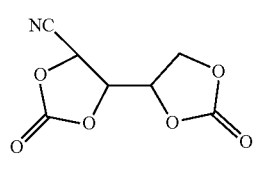

Compound 9
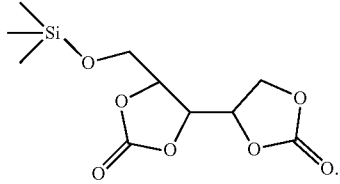

Preferably, the percentage mass content of the compound B is 0.1-5% based on the total mass of the non-aqueous electrolyte for lithium ion battery being 100%.

Preferably, in the compound A, C1-C5 alkyl is selected from one of methyl, ethyl, propyl, isopropyl and butyl; The C1-C5 haloalkyl is selected from one of monofluoromethyl, difluoromethyl, trifluoromethyl, 2-fluoroethyl, 2,2-difluoroethyl, 2,2,2-trifluoroethyl, 3,3-difluoropropyl, 3,3,3-trifluoropropyl and hexafluoroisopropyl; The C2-C5 unsaturated hydrocarbon group is selected from one of vinyl, allyl, 3-butenyl, isobutylenyl, 4-pentenyl, ethynyl, propargyl, 3-butynyl, and 1-methyl-2-propynyl.

Preferably, the compound A is at least one selected from the group consisting of tripropargyl phosphate, dipropargyl methyl phosphate, dipropargyl ethyl phosphate, dipropargyl propyl phosphate, trifluoromethyl dipropargyl phosphate, dipropargyl 2,2,2-trifluoroethyl phosphate, dipropargyl 3,3,3-trifluoropropyl phosphate, hexafluoroisopropyl dipropargyl phosphate, triallyl phosphate, diallyl methyl phosphate, diallyl ethyl phosphate, diallyl propyl phosphate, trifluoromethyl diallyl phosphate, 2,2,2-trifluoroethyl diallyl phosphate, diallyl 3,3,3-trifluoropropyl phosphate or diallyl hexafluoroisopropyl phosphate.

Preferably, the percentage mass content of the compound A is less than 2% based on the total mass of the non-aqueous electrolyte for lithium ion battery being 100%.

And, a lithium ion battery, comprises a positive electrode, a negative electrode, a separator interposed between the positive electrode and the negative electrode, and an electrolyte, wherein the electrolyte is the non-aqueous electrolyte for lithium ion battery.

Preferably, the positive electrode comprises a positive electrode active material, and the positive electrode active material is at least one of $LiNi_xCo_yMn_zL_{(1-x-y-z)}O_2$, $LiCo_xL_{(1-x)}O_2$, $LiNi_{x'}L'_{y'}Mn_{(2-x''-y'')}O_4$ and $Li_{z'}MPO_4$, wherein, L is at least one of Al, Sr, Mg, Ti, Ca, Zr, Zn, Si or Fe, $0 \leq x \leq 1$, $0 \leq y \leq 1$, $0 \leq z \leq 1$, $0 < x+y+z \leq 1$, $0 < x' \leq 1$, $0.3 \leq x'' \leq 0.6$, $0.01 \leq y' \leq 0.2$, L' is at least one of Co, Al, Sr, Mg, Ti, Ca, Zr, Zn, Si and Fe; $0.5 \leq z' \leq 1$, M is at least one of Fe, Mn and Co.

The non-aqueous electrolyte for lithium ion battery provided by the application contains both the compound A and compound B, which can effectively improve the high-temperature storage performance and cycle performance of the battery, so that the lithium ion battery containing the non-aqueous electrolyte has better cycle performance and high-temperature storage performance.

The lithium ion battery provided by the application contains the above-mentioned non-aqueous electrolyte, which enables the lithium ion battery to have both better cycle performance and high-temperature storage performance.

DETAILED DESCRIPTION OF DISCLOSED EMBODIMENTS

In order to make the technical problems to be solved, technical solutions and beneficial effects more apparent and clearer, the present application will be described in further detail below with reference to embodiments. It should be understood that the specific embodiments described herein are only for the purpose of explaining the present invention and are not intended to limit the present invention.

The non-aqueous electrolyte for lithium ion battery provided by the present application, comprises a compound A represented by formula I and a compound B represented by formula II, Formula I

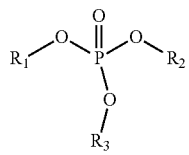

-continued

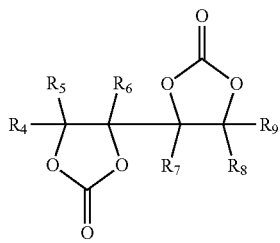

Formula II

In formula I, $R_1$, $R_2$ and $R_3$ are independently selected from C1-C5 alkyl or haloalkyl, C2-C5 unsaturated hydrocarbon group or unsaturated halohydrocarbon group, and at least one of $R_1$, $R_2$ and $R_3$ is the unsaturated hydrocarbon group or unsaturated halohydrocarbon group;

In formula II, $R_4$, $R_5$, $R_6$, $R_7$, $R_8$ and $R_9$ are each independently selected from one of hydrogen atom, halogen atom and C1-C5 group.

In the embodiments of the invention, C2-C5 indicates that the number of carbon atoms is 2-5, similarly, C1-C5 indicates that the number of carbon atoms is 1-5.

Preferably, in the compound A, C1-C5 alkyl is selected from one of methyl, ethyl, propyl, isopropyl and butyl; The C1-C5 haloalkyl is selected from one of monofluoromethyl, difluoromethyl, trifluoromethyl, 2-fluoroethyl, 2,2-difluoroethyl, 2,2,2-trifluoroethyl, 3,3-difluoropropyl, 3,3,3-trifluoropropyl and hexafluoroisopropyl; The C2-C5 unsaturated hydrocarbon group is selected from one of vinyl, allyl, 3-butenyl, isobutylenyl, 4-pentenyl, ethynyl, propargyl, 3-butynyl, and 1-methyl-2-propynyl.

Preferably, the compound A is at least one selected from the group consisting of tripropargyl phosphate, dipropargyl methyl phosphate, dipropargyl ethyl phosphate, dipropargyl propyl phosphate, trifluoromethyl dipropargyl phosphate, dipropargyl 2,2,2-trifluoroethyl phosphate, dipropargyl 3,3,3-trifluoropropyl phosphate, hexafluoroisopropyl dipropargyl phosphate, triallyl phosphate, diallyl methyl phosphate, diallyl ethyl phosphate, diallyl propyl phosphate, trifluoromethyl diallyl phosphate, 2,2,2-trifluoroethyl diallyl phosphate, diallyl 3,3,3-trifluoropropyl phosphate or diallyl hexafluoroisopropyl phosphate. The preferred compound A is more favorable for improving the high-temperature storage performance and cycle performance of the battery, and is better for improving the battery performance when used in combination with the compound B.

Preferably, the percentage mass content of the compound A is less than 2% based on the total mass of the non-aqueous electrolyte for lithium ion battery being 100%.

The non-aqueous electrolyte for lithium ion battery provided by the embodiments of the invention contains a compound A represented by structural formula I, and the compound A can form a film on the surface of the positive electrode of the battery during the formation process, thereby hindering the continuous decomposition of the electrolyte on the electrode surface, hence improving the high-temperature storage performance and cycle performance of the battery. However, the electrolyte obtained by using the compound A as an additive still has limited high-temperature storage performance and cycle performance and cannot meet the use requirements.

In the embodiments of the invention, on the basis of the compound A represented by structural formula I above, the compound B represented by structural formula II was added to the non-aqueous electrolyte for the lithium ion battery.

Through the combined use of the compound A and the compound B, films are effectively formed on the positive electrode and the negative electrode, and the high-temperature cycle performance and the high-temperature storage performance of the battery can be further improved.

Preferably, the C1-C5 group is selected from a hydrocarbon group, halogenated hydrocarbon group, oxygen-containing hydrocarbon group, silicon-containing hydrocarbon group, and cyano-substituted hydrocarbon group.

Further preferably, $R_4$, $R_5$, $R_6$, $R_7$, $R_8$ and $R_9$ are each independently selected from a hydrogen atom, fluorine atom, methyl group, ethyl group, methoxyl group, ethyoxyl group, triethylsiloxy group, cyano group or trifluoromethyl group.

Specifically preferably, the compound B comprises one or more of compounds 1-9 represented by the following structural formulae,

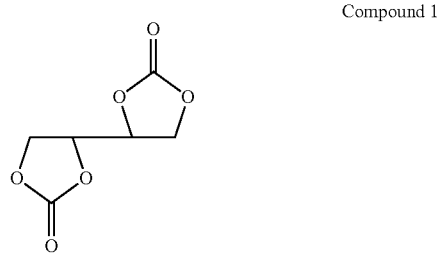

Compound 1

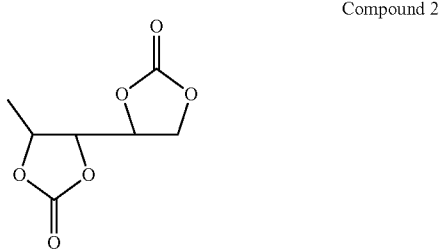

Compound 2

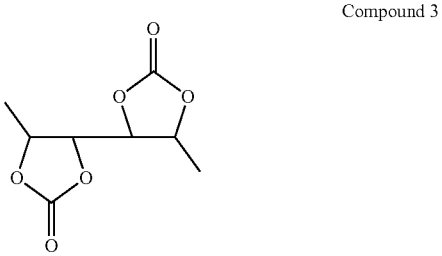

Compound 3

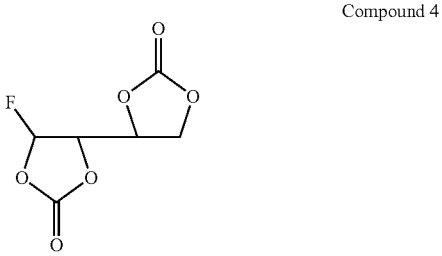

Compound 4

Compound 5
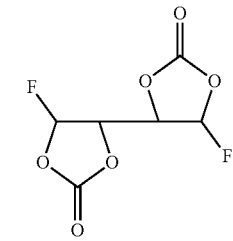

Compound 6
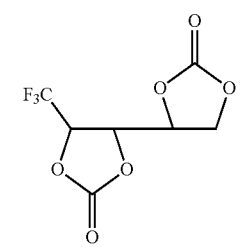

Compound 7
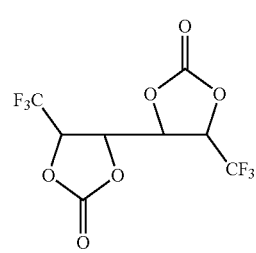

Compound 8
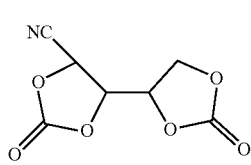

Compound 9
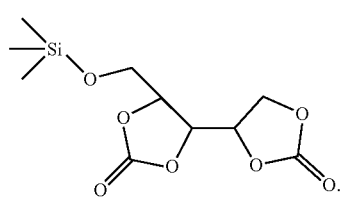

The above-mentioned preferred compound B can work better with the compound A, so as to give the lithium ion battery with excellent integral performance (including cycle performance and high-temperature storage performance).

It is further preferred that the percentage mass content of the compound B is 0.1-5% based on the total mass of the non-aqueous electrolyte for lithium ion battery being 100%. When the percentage mass content of the compound B is less than 0.1%, it is not favorable to the film formation of the compound B on the negative electrode, and the improvement effect on cycle performance is reduced; When the percentage mass content of the compound B is more than 5%, the compound B cannot be fully and uniformly dissolved in the non-aqueous electrolyte, and the film formation on the electrode interface is relatively thick, thus increasing the battery impedance to a certain extent and deteriorating the low-temperature performance of the battery.

The synthesis method of the compound B represented by formula I is conventional, for example, the compound B can be prepared by ester exchange reaction between polyol (such as erythritol, xylitol, etc.) and carbonate (such as dimethyl carbonate, diethyl carbonate, vinyl carbonate, etc.) in the presence of basic catalyst. An example of the synthetic route is as follows:

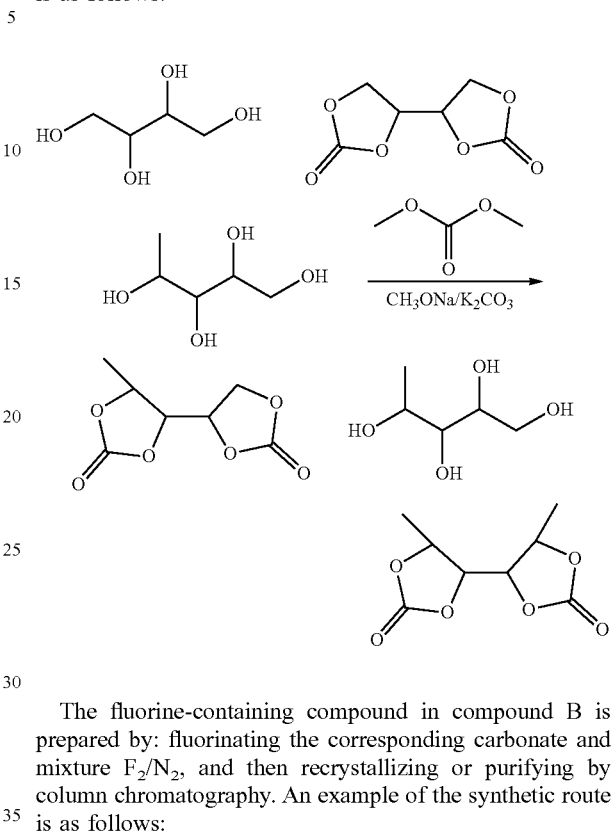

The fluorine-containing compound in compound B is prepared by: fluorinating the corresponding carbonate and mixture $F_2/N_2$, and then recrystallizing or purifying by column chromatography. An example of the synthetic route is as follows:

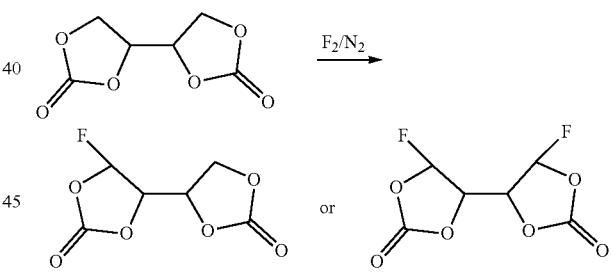

The cyano group-containing compound in compound B is prepared by: the chlorination reaction of the corresponding carbonate and sulfonyl chloride, then reacting with NaCN or KCN, and then recrystallizing or purifying by column chromatography. An example of the synthetic route is as follows:

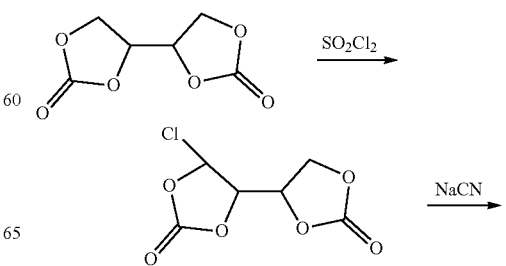

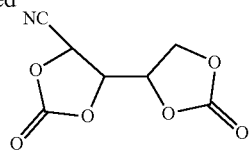

The trimethylsilanolate-containing compound in the compound B is prepared by: the substitution reaction of the corresponding hydroxy carbonate and silazane, then recrystallizing or purifying by column chromatography. An example of the synthetic route is as follows:

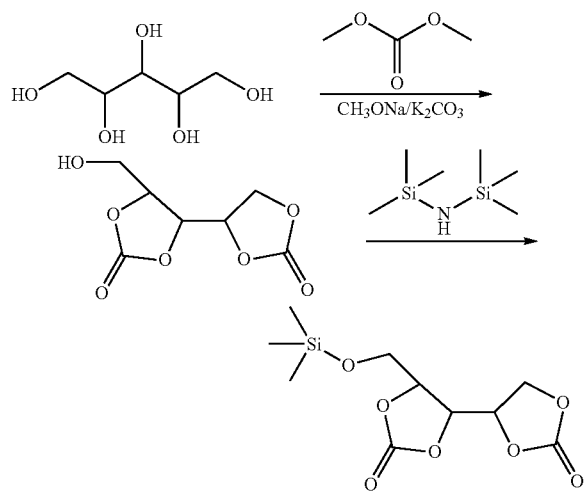

Further preferably, the percentage mass content of the compound B is 0.1-2% based on the total mass of the non-aqueous electrolyte for lithium ion battery being 100%.

It is understood that if the non-aqueous electrolyte for lithium ion battery contains one of the above substances, the content is the content of the one substance; If the non-aqueous electrolyte for lithium ion battery contains a plurality of the above substances, the content is the sum of the contents of the plurality of substances.

The non-aqueous electrolyte for lithium ion battery provided by the embodiment of the invention contains both the compound A and compound B, which can effectively improve the high-temperature storage performance and high-temperature cycle performance of the battery, so that the lithium ion battery containing the non-aqueous electrolyte has better cycle performance and high-temperature storage performance.

Based on the above embodiments, it is preferred that the lithium ion non-aqueous electrolyte further comprises at least one of unsaturated cyclic carbonate compounds, fluorine-substituted cyclic carbonate compounds, and sultone compounds.

Preferably, the unsaturated cyclic carbonate compound includes at least one of vinylene carbonate (VC) and vinyl ethylene carbonate (VEC). The fluorine-substituted cyclic carbonate compound includes fluoroethylene carbonate (FEC). The sultone compound is selected from at least one of 1,3-propane sultone (1,3-PS), 1,4-butane sultone (1,4-BS), and 1,3-propene sultone (PST). The content of unsaturated cyclic carbonate compound is 0.1-5% based on the total mass of the non-aqueous electrolyte for lithium ion battery being 100%.

The content of fluorine-substituted cyclic carbonate compound is 0.1-30% based on the total mass of the non-aqueous electrolyte for lithium ion battery being 100%.

The percentage mass content of sultone compound is 0.1-5% based on the total mass of the non-aqueous electrolyte for lithium ion battery being 100%.

As is known to those skilled in the art, the main components in the non-aqueous electrolyte for lithium ion battery are non-aqueous organic solvents, lithium salts and additives. In the present application, compound A and compound B are additives. The content of non-aqueous organic solvent and lithium salt is conventional, and it can be adjusted accordingly after the content of the additive including compound A and compound B is determined.

Preferably, the lithium salt is selected from one or more of $LiPF_6$, $LiBF_4$, LiBOB, LiDFOB, $LiN(SO_2CF_3)_2$, $LiN(SO_2C_2F_5)_2$, $LiC(SO_2CF_3)_3$ and $LiN(SO_2F)_2$. The lithium salt content in the non-aqueous electrolyte for lithium ion battery is 0.1-15%.

Preferably, the non-aqueous electrolyte for lithium ion battery comprises a non-aqueous organic solvent, and the non-aqueous organic solvent is at least one of vinyl carbonate, propylene carbonate, butylene carbonate, dimethyl carbonate, diethyl carbonate, methyl ethyl carbonate and methyl propyl carbonate. More preferably, the non-aqueous organic solvent is a composition of vinyl carbonate, diethyl carbonate and methyl ethyl carbonate.

And, the invention also provides a lithium ion battery, comprising a positive electrode, a negative electrode, a separator interposed between the positive electrode and the negative electrode, and an electrolyte, wherein the electrolyte is the non-aqueous electrolyte for lithium ion battery.

Preferably, the positive electrode comprises a positive electrode active material, and the positive electrode active material is at least one of $LiNi_xCo_yMn_zL_{(1-x-y-z)}O_2$, $LiCo_xL_{(1-x')}O_2$, $LiNi_{x''}L'_{y'}Mn_{(2-x''-y')}O_4$, $Li_z$ and $MPO_4$, wherein, L is at least one of Al, Sr, Mg, Ti, Ca, Zr, Zn, Si or Fe, $0 \le x \le 1$, $0 \le y \le 1$, $0 \le z \le 1$, $0 < x+y+z \le 1$, $0 < x' \le 1$, $0.3 \le x'' \le 0.6$, $0.01 \le y' \le 0.2$, L' is at least one of Co, Al, Sr, Mg, Ti, Ca, Zr, Zn, Si and Fe; $0.5 \le z' \le 1$, M is at least one of Fe, Mn and Co.

In the embodiment of the present invention, the negative electrode and the separator are not specifically limited, they can be the conventional ones in the art.

The lithium ion battery provided by the application contains the above-mentioned non-aqueous electrolyte, which enables the lithium ion battery to have both better cycle performance and high-temperature storage performance.

The following description will be made with reference to specific embodiments.

Embodiment 1

A 4.4V $LiNi_{0.5}Co_{0.2}Mn_{0.3}O_2$/artificial graphite battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 1 of embodiment 1, based on the total weight of the non-aqueous electrolyte taken as 100% by weight.

Embodiment 2

A 4.4V $LiNi_{0.5}Co_{0.2}Mn_{0.3}O_2$/artificial graphite battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 1 of embodiment 2, based on the total weight of the non-aqueous electrolyte taken as 100% by weight.

Embodiment 3

A 4.4V $LiNi_{0.5}Co_{0.2}Mn_{0.3}O_2$/artificial graphite battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 1 of embodiment 3, based on the total weight of the non-aqueous electrolyte taken as 100% by weight.

Embodiment 4

A 4.4V $LiNi_{0.5}Co_{0.2}Mn_{0.3}O_2$/artificial graphite battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 1 of embodiment 4, based on the total weight of the non-aqueous electrolyte taken as 100% by weight.

Embodiment 5

A 4.4V $LiNi_{0.5}Co_{0.2}Mn_{0.3}O_2$/artificial graphite battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 1 of embodiment 5, based on the total weight of the non-aqueous electrolyte taken as 100% by weight.

Embodiment 6

A 4.4V $LiNi_{0.5}Co_{0.2}Mn_{0.3}O_2$/artificial graphite battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 1 of embodiment 6, based on the total weight of the non-aqueous electrolyte taken as 100% by weight.

Embodiment 7

A 4.4V $LiNi_{0.5}Co_{0.2}Mn_{0.3}O_2$/artificial graphite battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 1 of embodiment 7, based on the total weight of the non-aqueous electrolyte taken as 100% by weight.

Embodiment 8

A 4.4V $LiNi_{0.5}Co_{0.2}Mn_{0.3}O_2$/artificial graphite battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 1 of embodiment 8, based on the total weight of the non-aqueous electrolyte taken as 100% by weight.

Embodiment 9

A 4.4V $LiNi_{0.5}Co_{0.2}Mn_{0.3}O_2$/artificial graphite battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 1 of embodiment 9, based on the total weight of the non-aqueous electrolyte taken as 100% by weight.

Embodiment 10

A 4.4V $LiNi_{0.5}Co_{0.2}Mn_{0.3}O_2$/artificial graphite battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 1 of embodiment 10, based on the total weight of the non-aqueous electrolyte taken as 100% by weight.

Embodiment 11

A 4.4V $LiNi_{0.5}Co_{0.2}Mn_{0.3}O_2$/artificial graphite battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 1 of embodiment 11, based on the total weight of the non-aqueous electrolyte taken as 100% by weight.

Embodiment 12

A 4.4V $LiNi_{0.5}Co_{0.2}Mn_{0.3}O_2$/artificial graphite battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 1 of embodiment 12, based on the total weight of the non-aqueous electrolyte taken as 100% by weight.

Embodiment 13

A $LiNi_{0.8}Co_{0.15}Al_{0.05}O_2$/Si—C battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 2 of embodiment 13, based on the total weight of the non-aqueous electrolyte taken as 100% by weight.

Embodiment 14

A $LiNi_{0.8}Co_{0.15}Al_{0.05}O_2$/Si—C battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 2 of embodiment 14, based on the total weight of the non-aqueous electrolyte taken as 100% by weight.

Comparative Example 1

A 4.4V $LiNi_{0.5}Co_{0.2}Mn_{0.3}O_2$/artificial graphite battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 1 of Comparative Example 1, based on the total weight of the non-aqueous electrolyte taken as 100% by weight.

Comparative Example 2

A 4.4V $LiNi_{0.5}Co_{0.2}Mn_{0.3}O_2$/artificial graphite battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 1 of Comparative Example 2, based on the total weight of the non-aqueous electrolyte taken as 100% by weight.

Comparative Example 3

A 4.4V $LiNi_{0.5}Co_{0.2}Mn_{0.3}O_2$/artificial graphite battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 1 of Comparative Example 3, based on the total weight of the non-aqueous electrolyte taken as 100% by weight.

Comparative Example 4

A 4.4V $LiNi_{0.5}Co_{0.2}Mn_{0.3}O_2$/artificial graphite battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 1 of Comparative Example 4, based on the total weight of the non-aqueous electrolyte taken as 100% by weight.

Comparative Example 5

A 4.4V $LiNi_{0.5}Co_{0.2}Mn_{0.3}O_2$/artificial graphite battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 1 of Comparative Example 5, based on the total weight of the non-aqueous electrolyte taken as 100% by weight.

Comparative Example 6

A 4.4V $LiNi_{0.5}Co_{0.2}Mn_{0.3}O_2$/artificial graphite battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 1 of Comparative Example 6, based on the total weight of the non-aqueous electrolyte taken as 100% by weight.

Comparative Example 7

A $LiNi_{0.8}Co_{0.15}Al_{0.05}O_2$/Si—C battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 2 of Comparative Example 7, based on the total weight of the non-aqueous electrolyte taken as 100% by weight.

Comparative Example 8

A $LiNi_{0.8}Co_{0.15}Al_{0.05}O_2$/Si—C battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 2 of Comparative Example 8, based on the total weight of the non-aqueous electrolyte taken as 100% by weight.

The Embodiments 1-14 and the Comparative Examples 1-8 were tested for performance, and the test parameters and test methods are as follows:

(1) High-temperature cycle performance is demonstrated by testing the capacity retention rate after N cycles at 45° C. 1 C. The specific method is as follows: at 45° C., the formed battery was charged to 4.4V with 1 C constant current/constant voltage, the cutoff current was 0.01 C, and then discharged to 3.0V with 1 C constant current. After such charging/discharging for N cycles, the capacity retention rate after the Nth cycle was calculated to evaluate its high-temperature cycle performance.

The calculation formula of the Nth cycle capacity retention rate at 45° C. 1 C is as follows:

The $N$th cycle capacity retention rate (%)=(the $N$th cycle discharge capacity/the first cycle discharge capacity)*100%.

(2) Room-temperature cycle performance is demonstrated by testing the capacity retention rate after N cycles at 25° C. 1 C. The specific method is as follows: at 25° C., the formed battery was charged to 4.4V with 1 C constant current/constant voltage, the cutoff current was 0.01 C, and then discharged to 3.0V with 1 C constant current. After such charging/discharging for N cycles, the capacity retention rate after the Nth cycle was calculated to evaluate its room-temperature cycle performance.

The calculation formula of the Nth cycle capacity retention rate at 25° C. 1 C is as follows:

The $N$th cycle capacity retention rate (%)=(the $N$th cycle discharge capacity/the first cycle discharge capacity)*100%.

(3) Test method for capacity retention rate, capacity recovery rate and thickness expansion rate after N days of storage at 60° C.: the formed battery was charged to 4.4V at room temperature with 1 C constant current/constant voltage, the cutoff current was 0.01 C, then discharged to 3.0V with 1 C constant current, the initial discharge capacity of the battery was measured, then charged to 4.4V with 1 C constant current/constant voltage, the cutoff current was 0.01 C, and the initial thickness of the battery was measured. Then the battery was stored at 60° C. for N days, measured the thickness of the battery, discharged it to 3.0V with 1 C constant current, measured the capacity retention of the battery, then charged it to 4.4V with 1 C constant current/constant voltage, the cutoff current was 0.01 C, then discharged it to 3.0V with 1 C constant current, then measured the recovery capacity. The calculation formulas for capacity retention rate and capacity recovery rate are as follows:

Battery capacity retention rate (%)=(retention capacity/initial capacity)*100%;

Battery capacity recovery rate (%)=(recovery capacity/initial capacity)*100%;

Battery thickness expansion rate (%)=(thickness after $N$ days−initial thickness)/initial thickness*100%.

The test results of Embodiments 1-18 and Comparative Examples 1-3 are shown in Table 1 below.

TABLE 1

|  | Compound A | Compound B | Other additives | The 500th cycle capacity retention rate (%) at 25° C. 1 C | The 300th cycle capacity retention rate (%) at 45° C. 1 C | After 30 days of storage at 60° C. | | |
|---|---|---|---|---|---|---|---|---|
|  |  |  |  |  |  | Capacity retention rate (%) | Capacity recovery rate (%) | Thickness expansion rate (%) |
| Embodiment 1 | Tripropargyl phosphate: 1% | Compound 1: 1% |  | 91.50 | 82.00 | 85.30 | 88.30 | 5.70 |
| Embodiment 2 | Tripropargyl phosphate: 1% | Compound 3: 1% |  | 91.40 | 81.10 | 85.50 | 88.60 | 5.30 |
| Embodiment 3 | Tripropargyl phosphate: 1% | Compound 5: 1% |  | 91.10 | 81.90 | 85.40 | 87.90 | 4.90 |
| Embodiment 4 | Tripropargyl phosphate: 1% | Compound 1: 0.1% |  | 90.50 | 79.50 | 82.00 | 84.10 | 6.10 |
| Embodiment 5 | Tripropargyl phosphate: 1% | Compound 1: 0.5% |  | 91.20 | 80.00 | 83.00 | 85.60 | 5.50 |
| Embodiment 6 | Tripropargyl phosphate: 1% | Compound 1: 2% |  | 92.00 | 85.00 | 86.50 | 88.20 | 3.90 |
| Embodiment 7 | Tripropargyl phosphate: 0.5% | Compound 1: 1% |  | 91.00 | 81.00 | 83.50 | 85.30 | 5.80 |
| Embodiment 8 | Dipropargyl ethyl phosphate: 1% | Compound 1: 1% |  | 90.00 | 80.10 | 81.50 | 83.30 | 6.30 |
| Embodiment 9 | Hexafluoroisopropyl bis (propargyl) phosphate: 1% | Compound 1: 1% |  | 86.00 | 76.00 | 79.70 | 81.50 | 7.00 |
| Embodiment 10 | Tripropargyl phosphate: 1% | Compound 1: 1% | VC: 1% | 92.70 | 84.50 | 85.80 | 88.80 | 5.60 |
| Embodiment 11 | Tripropargyl phosphate: 1% | Compound 1: 1% | FEC: 1% | 92.80 | 84.90 | 85.80 | 88.90 | 5.90 |
| Embodiment 12 | Tripropargyl phosphate: 1% | Compound 1: 1% | PS: 1% | 92.90 | 85.10 | 85.20 | 89.30 | 5.60 |
| Comparative Example 1 | Tripropargyl phosphate: 1% | / |  | 81.50 | 76.60 | 80.10 | 83.20 | 8.20 |
| Comparative Example 2 | Dipropargyl ethyl phosphate: 1% | / |  | 70.00 | 65.00 | 77.00 | 80.00 | 10.40 |
| Comparative Example 3 | Hexafluoroisopropyl bis (propargyl) phosphate: 1% | / |  | 66.00 | 60.00 | 75.00 | 77.00 | 12.50 |
| Comparative Example 4 | Tripropargyl phosphate: 1% |  | VC: 1% | 86.00 | 79.00 | 81.00 | 84.00 | 10.00 |
| Comparative Example 5 | Tripropargyl phosphate: 1% |  | FEC: 1% | 87.70 | 78.90 | 80.70 | 83.80 | 12.00 |
| Comparative Example 6 | Tripropargyl phosphate: 1% |  | PS: 1% | 87.10 | 79.10 | 81.20 | 84.30 | 11.90 |

As is well known to those skilled in the art, the Embodiments and Comparative Examples in Table 1 and Table 2 above include conventional solvents, lithium salts and other substances in addition to the listed substances, which are not specifically described in the present application, and, in the electrolyte, the weight other than the listed above is the content of solvent and lithium salt.

Referring to Table 1, Embodiments 1-12 and Comparative Examples 1-6 are compared. Both compound A and compound B were added to the lithium ion non-aqueous electrolyte of Embodiments 1-12, and only Compound A was added to the lithium ion non-aqueous electrolyte of Comparative Examples 1-6. The results show that compared with Comparative Examples 1-6, the batteries made with the lithium ion non-aqueous electrolyte containing both Compound A and Compound B have obviously improved cycle performance at 25° C. and 45° C., as well as better storage performance at 60° C. It can be seen that the combined use of compound A and compound B can have synergistic effect, which can obviously improve the high-temperature storage and high-temperature cycle performances of the battery.

The test results of Embodiments 13-14 and Comparative Examples 7-8 are shown in Table 2 below.

Referring to Table 2, Embodiments 13, 14 and Comparative Examples 7, 8 are compared. Both compound A and compound B were added to the lithium ion non-aqueous electrolyte of Embodiments 13 and 14. The results show that the lithium ion non-aqueous electrolyte containing only compound A has relatively low room-temperature cycle performance and high-temperature cycle performance, and obviously poor high-temperature storage performance. On the basis of adding compound A and B, the normal temperature cycle performance and high temperature cycle performance of the battery are improved.

The above descriptions are only preferred embodiments and are not intended to limit the present invention. Any modifications, equivalent substitutions and improvements made within the spirit and principles of the present invention shall be included within the scope of protection of the present invention.

The invention claimed is:

1. A non-aqueous electrolyte for a lithium ion battery, comprising a compound A represented by formula I and a compound B represented by formula II,

TABLE 2

|  | Compound A | Compound B | The 400th cycle capacity retention rate (%) at room temperature 1 C | The 200th cycle capacity retention rate (%) at 45° C. 1 C | After 14 days of storage at 60° C. | | |
|---|---|---|---|---|---|---|---|
|  |  |  |  |  | Capacity retention rate (%) | Capacity recovery rate (%) | Thickness expansion rate (%) |
| Embodiment 13 | Tripropargyl phosphate: 1% | Compound 1: 1% | 80.3 | 80.6 | 80.5 | 82.6 | 9.1 |
| Embodiment 14 | Dipropargyl ethyl phosphate: 1% | Compound 1: 1% | 80.8 | 81.3 | 80.4 | 82.5 | 10 |
| Comparative Example 7 | Tripropargyl phosphate: 1% |  | 70.2 | 72.1 | 70.3 | 72.8 | 18 |
| Comparative Example 8 | Dipropargyl ethyl phosphate: 1% |  | 69.4 | 60.8 | 69.5 | 72.1 | 20 |

Formula I

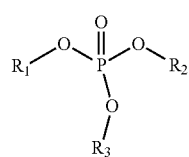

Formula II

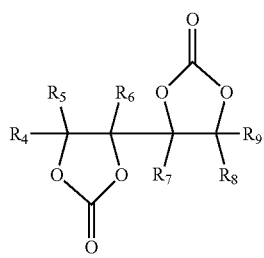

in formula I, $R_1$, $R_2$ and $R_3$ are independently selected from a C1-C5 alkyl group or a C1-C5 haloalkyl group, a C2-C5 unsaturated hydrocarbon group or a C2-C5 unsaturated halohydrocarbon group, and at least one of $R_1$, $R_2$ and $R_3$ is the unsaturated hydrocarbon group or unsaturated halohydrocarbon group;

in formula II, $R_4$, $R_5$, $R_6$, $R_7$, $R_8$ and $R_9$ are each independently selected from one of a hydrogen atom, a fluorine atom and a C1-C5 group;

the percentage mass content of the compound B is 0.1-2% based on the total mass of the non-aqueous electrolyte for a lithium ion battery being 100%.

2. The non-aqueous electrolyte for a lithium ion battery of claim 1, wherein in formula II, the C1-C5 group is selected from a hydrocarbon group, a halogenated hydrocarbon group, an oxygen-containing hydrocarbon group, a silicon-containing hydrocarbon group, and a cyano-substituted hydrocarbon group.

3. The non-aqueous electrolyte for a lithium ion battery of claim 1, wherein in formula II, $R_4$, $R_5$, $R_6$, $R_7$, $R_8$ and $R_9$ are each independently selected from a hydrogen atom, a fluorine atom, a methyl group, an ethyl group, a methoxyl group, an ethyoxyl group, a triethylsiloxy group, a cyano group or a trifluoromethyl group.

4. The non-aqueous electrolyte for a lithium ion battery of claim 1, wherein the compound B comprises one or more of compounds 1-9 represented by the following structural formulae, Compound 1

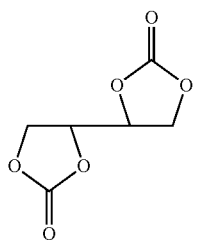

Compound 2

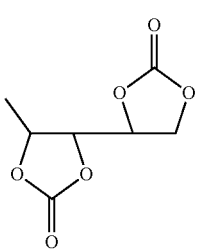

Compound 3

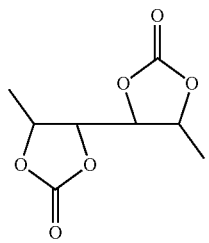

Compound 4

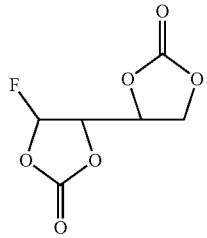

Compound 5

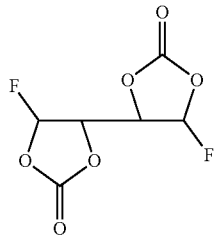

Compound 6

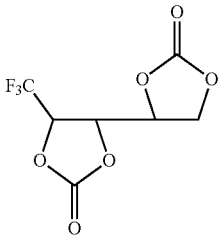

Compound 7

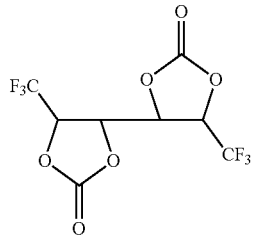

Compound 8

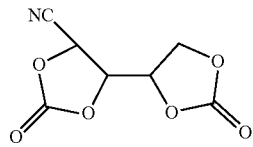

Compound 9

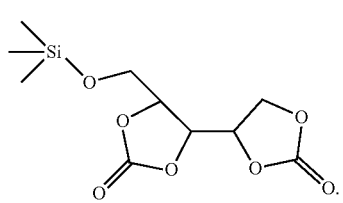

5. The non-aqueous electrolyte for a lithium ion battery of claim 1, wherein in the compound A, the C1-C5 alkyl group is selected from one of methyl, ethyl, propyl, isopropyl and butyl; the C1-C5 haloalkyl group is selected from one of monofluoromethyl, difluoromethyl, trifluoromethyl, 2-fluoroethyl, 2,2-difluoroethyl, 2,2,2-trifluoroethyl, 3,3-difluoropropyl, 3,3,3-trifluoropropyl and hexafluoroisopropyl; the C2-C5 unsaturated hydrocarbon group is selected from one of vinyl, allyl, 3-butenyl, isobutylenyl, 4-pentenyl, ethynyl, propargyl, 3-butynyl, and 1-methyl-2-propynyl.

6. The non-aqueous electrolyte for a lithium ion battery of claim 5, wherein the compound A comprises at least one of tripropargyl phosphate, dipropargyl methyl phosphate, dipropargyl ethyl phosphate, dipropargyl propyl phosphate, trifluoromethyl dipropargyl phosphate, dipropargyl 2,2,2-trifluoroethyl phosphate, dipropargyl 3,3,3-trifluoropropyl phosphate, hexafluoroisopropyl dipropargyl phosphate, triallyl phosphate, diallyl methyl phosphate, diallyl ethyl phosphate, diallyl propyl phosphate, trifluoromethyl diallyl phosphate, 2,2,2-trifluoroethyl diallyl phosphate, diallyl 3,3,3-trifluoropropyl phosphate or diallyl hexafluoroisopropyl phosphate.

7. The non-aqueous electrolyte for a lithium ion battery of claim 1, wherein the percentage mass content of the compound A is greater than 0%, and less than 2% based on the total mass of the non-aqueous electrolyte for a lithium ion battery being 100%.

8. A lithium ion battery, comprising a positive electrode, a negative electrode, a separator interposed between the positive electrode and the negative electrode, and an electrolyte, wherein the electrolyte is the non-aqueous electrolyte for a lithium ion battery of claim 1.

9. The lithium ion battery of claim 8, wherein the positive electrode comprises a positive electrode active material, and the positive electrode active material is at least one of $LiNi_xCo_yMn_zL_{(1-x-y-z)}O_2$, $LiCo_xL_{(1-x')}O_2$, $LiNi_{x''}L'_{y'}Mn_{(2-x''-y')}O_4$ and $Li_zMPO_4$, wherein, L is at least one of Al, Sr, Mg, Ti, Ca, Zr, Zn, Si or Fe, $0 \leq x \leq 1$, $0 \leq y \leq 1$, $0 \leq z \leq 1$, $0 < x+y+z \leq 1$, $0 < x' \leq 1$, $0.3 \leq x'' \leq 0.6$, $0.01 \leq y' \leq 0.2$, L' is at least one of Co, Al, Sr, Mg, Ti, Ca, Zr, Zn, Si and Fe; $0.5 \leq z' \leq 1$, M is at least one of Fe, Mn and Co.

* * * * *